United States Patent [19]

Ho et al.

[11] Patent Number: 5,057,544
[45] Date of Patent: Oct. 15, 1991

[54] INTEGRAL SKIN RIGID URETHANE FOAM

[75] Inventors: David J. Ho; David C. Krueger, both of Grosse IIe, Mich.

[73] Assignee: BASF Corporation, Parsippany, N.J.

[21] Appl. No.: 614,321

[22] Filed: Nov. 16, 1990

[51] Int. Cl.$^5$ ............................................. C08G 18/14
[52] U.S. Cl. .................................... 521/51; 521/173; 521/176
[58] Field of Search .......................... 521/51, 173, 176

[56] References Cited

U.S. PATENT DOCUMENTS 4,780,482 10/1988 Krueger ................................. 521/51

Primary Examiner—Maurice J. Welsh
Attorney, Agent, or Firm—Martin P. Connaughton

[57] ABSTRACT

The present invention relates to an integral skin rigid polyurethane foam having improved compressive strength and flexural strength. This foam is prepared by reacting a polyol resin component with an aromatic isocyanate using water as an auxiliary blowing agent.

12 Claims, No Drawings

INTEGRAL SKIN RIGID URETHANE FOAM

BACKGROUND OF THE INVENTION

1. Field of the Invention

The present invention pertains to integral skin polyurethane foam. More particularly, the present invention relates to integral skin rigid polyurethane foam which contains a polyoxyethylene capped polyether polyol and uses water as an auxiliary blowing agent.

Integral skin rigid polyurethane foams having high impact strength, high heat distortion, and flame retardant properties are described in U.S. Pat. No. 4,780,482.

2. Summary of the Invention

The present invention applies to integral skin rigid polyurethane foam compositions and their preparation. These foams exhibit improved compressive strength and flexural strength.

For a more complete understanding of the present invention, reference is made to the following detailed description and the examples thereof.

DETAILED DESCRIPTION OF THE INVENTION

Polyurethane integral skin foams are known in the art. A general description of such foams is contained in *Polyurethane Handbook*, pp. 315-316 (G. Oertel ed. 1985). The typical integral skin foam is only obtained when certain process conditions are maintained. In general, the formation of the skin is influenced mainly by mold temperature and mold pressure. These two variables result in an equilibrium between the liquid component and the blowing agent. Near the relatively cooler surface of the mold the liquid state is favored whereas in the hotter center the blowing agent is gaseous thus producing foam. Reaction mixtures are blown almost exclusively with low boiling halogenated alkanes. In general, water is not a suitable blowing agent in this application. The isocyanate-water reaction leads to liberation of $CO_2$. $CO_2$ does not condense as readily at the surface as volatile agents such as halogenated alkanes and is therefor not considered as suitable in the formation of integral skin foams.

It has unexpectedly been found that, in the preparation of integral skin rigid polyurethane foam, products exhibiting improved compressive strength and flexural strength may be obtained by reacting, (a) A polyol selected from the group consisting of polyoxyalkylene polyether polyols, polyester polyols, and mixtures thereof; with the proviso that at least one of the polyols has a polyoxyethylene cap, (b) an organic aromatic polyisocyanate wherein the isocyanates are aromatically bound, (c) a chain extender, (d) a blowing agent mixture having water as an auxiliary component, (e) A catalyst capable of promoting urethane formation, and (f) optionally pigments and flame retardants.

Representative polyols which may be employed in the invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxy-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also alkylene oxide adducts of compounds which contain one SH group and one OH group as well as those which contain an amino group and an SH group may be used.

The alkylene oxide adducts of amines are prepared by reacting the alkylene oxides with 2,3- 2,6-, 3,4-, 2-5- and 2,4-toluenediamine, ethylene diamine or diaminodiphenylmethane. The procedures employed are those well known to those skilled in the art.

Any suitable alkylene oxide may be used such as ethylene oxide, propylene oxide, butylene oxide, amylene oxide and mixtures of these oxides. Preferred are ethylene oxide and propylene oxide wherein the ethylene oxide content is less than about 35 weight percent of the adduct. The molecular weights of these adducts may range from about 400 to about 800. Polyoxyethylene polyester polyols, other than those derived from the diamines, are also employed in conjunction with the adducts of the diamines. The amounts of these non-amine polyols may range from about 0 weight percent to about 50 weight percent based on the total weight of the foam composition. The molecular weight of these polyols may range from about 200 to about 1000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-αethyl-glutaric acid, α,β-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolthane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Other polyesters which may be employed are the mixed polyesters derived from the "bottoms" obtained by the transesterification of the dimethylterephthalate esters with diethylene glycol. One common designation is TERATE 203. Other polyesters which may be employed are the mixed polyester polyols derived from polyethylene terephthalate. Such polyesters are designated as Chardol 574, 570 and 740. These polyesters may have hydroxyl numbers from about 300 to about 800.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxy ethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and Encyclopedia of Chemical Technology, Vol. 7, pp, 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from about 100 to about 1000.

Suitable polyhydric polythioethers which may be condensed with alkylene oxides include the condensation product of thiodiglycol or the reaction product of a dicarboxylic acid such as is disclosed above for the preparation of the hydroxyl containing polyesters with any other suitable thioether glycol.

Polyhydroxy-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two -SH groups such as 2-mercaptoethanol, 1,2-ethanedithiol, 1,2-propanedithiol, 1,3-propanedithiol, and 1,6-hexane dithiol; alkene thiols such as 2-butene-1,4-dithiol; and alkyne thiols such as 3-hexyne-1,6-dithiol.

The polyurethane foams employed in the present invention are generally prepared by the reaction of the polyols with an organic polyisocyanate in the presence of a blowing agent and in the presence of additional polyhydroxyl-containing components, chain-extending agents, catalysts, surface-active agents, stabilizers, dyes, fillers and pigments. Suitable processes for the preparation of cellular polyurethane foams are disclosed in U.S. Pat. No. Re. 24,514 together with suitable machinery to be used in conjunction therewith.

Organic polyisocyanates which may be employed include aromatic, polyisocyanates. Representative of these types are the diisocyanates such as m-phenylene diisocyanate, 2,4-toluene diisocyanate, 2.6-toluene diisocyanate, mixtures of 2,4-and 2,6-toluene diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3.3'-dimethldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethldiphenylmethane-2,2'-5.5'-tetraisocyanate and polymeric polyisocyanates such as polymethylene polyphenylene polyisocyanate.

Especially preferred isocyanates in this invention include diphenylmethane diisocyanate, polymeric diphenylmethane diisocyanate, and carbodiimide modified diphenylmethane diisocyanate.

Chain extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, glycerine trimethylolpropane, propylene glycol, 1,4-butanediol and primary and secondary diamines such as phenylenediamine, 2,5-cyclohexane-bis-(methylamine), ethylenediamine, diethylenetriamine, N-(2-hydroxypropyl)ethylenediamine, N,N'-di(2-hydroxypropyl)ethylenediamine, piperazine, 2-methylpiperazine, 2,3-,2,6- 3,4-, 2,5-, 2,4-toluenediamine, 2,4'- and 4,4'-diphenylmethanediamine.

An especially preferred group of chain extenders are glycerine and alkanolamines, such as triethanolamine and triisopropanolamine.

Any suitable catalyst may be used including tertiary amines such as, for example, triethylenediamine, N-methylmorpholine, N-ethylmorpholine, diethylethanolamine, N-cocomorpholine, 1-methyl-4-dimethylamino-ethylpiperazine, -methoxypropyldimethylamine, N,N,N'-trimethylisopropyl propylenediamine, 3-diethylamineopropyldiethylamine, dimethylbenzylamine, and the like. Other suitable catalysts are, for example, dibutyltin dilaurate, dibutyltindiacetate, stannous chloride, dibutyltin di-2-ethyl hexanoate, stannous oxide as well as other organometallic compounds such as are disclosed in U.S. Pat. No. 2,846,408.

A surface-active agent is generally necessary for production of high grade polyurethane foam according to the present invention, since in the absence of same, the foams may collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of lone chain alkyl acid sulfate esters, alkyl sulfonic esters, and alkyl arylsulfonic acids.

The blowing agents contemplated in the present are combinations of water and a volatile blowing agent. The halogenated hydrocarbons are examples of the preferred type of volatile blowing agent. Examples of these halogenated hydrocarbons include, dichlorofluoromethane, trichlorofluoromethane, 1,1,2-trichloro-1,1,2-trifluoroethane, and dichlorodifluroethane. The amount of water added to the resin component in relation to the amount halogenated hydrocarbon added ranges from about 0.09:9.0 wt. % to about 0.9:1.6 wt % based on the total weight of the resin component.

It is within the spirit of the invention and the scope of knowledge of those skilled in the art to employ pigments such as carbon black, fillers, and flame retardants. Among the flame retardants which may be employed are: pentabromodiphenyl oxide, dibromopropanol, tris($\beta$-chloropropyl)phosphate, 2,2-bis(bromoethyl) 1,3-propanediol, tetrakis(2-chloroethyl) ethylene diphosphate, tris(2,3-dibromopropyl)phosphate, tris($\beta$-chloroethyl)-phosphate, tris(1,2-dichloropropyl)phosphate, bis-(2-chloro-ethyl) 2-chloroethylphosphonate, molybdenum trioxide, ammonium molybdate, ammonium phosphate, pentabromodiphenyloxide, tricresyl phosphate, hexabromocyclododecane and dibromoethyldibromocyclohexane.

The following examples serve only to illustrate and are not limiting in nature. All parts are by weight unless otherwise designated. The physical properties were determined using the following ASTM test methods D1622—Density
D1621—Compressive strength
D790—Flexural strength Polyol A is a propylene oxide, ethylene oxide adduct of glycerine containing 80% propylene oxide, and having a hydroxyl number of about 35.

Polyol B is a propylene oxide adduct of sucrose and dipropylene glycol having a hydroxyl number of about 395.

Polyol C is a propylene oxide adduct of toluenediamine containing 90 percent vicinal isomers having a hydroxyl number of about 390.

T-203 is a mixture of dimethyl and diethylene glycol esters of of terephthalic acid having a hydroxyl number of about 310 and sold by Hercules Corporation.

TIPA is triisopropanolamine.

DC-197 is a silicone surfactant sold by Dow Corning Corporation.

L-5420 is a silicone surfactant sold by Union Carbide Corporation.

DIDP is diisodecylphthalate.

F-11A is dichlorodifluoromethane sold by DuPont Corporation.

F-113 is 1,1,2-trichloro-1,1,2-trifluoroethane sold by DuPont Corporation.

Dabco 33LV is 33 percent triethylenediamine in dipropylene glycol sold by Air Products Corporation.

UL-1 is a tin catalyst sold by Fomrez Corporation.

Niax A-1 is 70% bis-2,N,N-dimethylaminoethyl-ether in 30% dipropylene glycol sold by Union Carbide Corporation.

M-20S is a polymeric methylene diphenyldiisocyante (MDI) containing about 44% 2-ring MDI sold by BASF Corporation.

PCF is tris($\beta$-chloropropyl) phosphate sold by Stauffer Chemical.

The foam preparation used for Examples A through C was a hand mix procedure.

The indicated amounts of polyether polyols, ester, and glycerine were added to a suitable mixing container. Melted TIPA was added in the appropriate amounts. To this container silicone surfactants, blowing agents, catalyst and other additives as indicated in the tables were added and well mixed in the container. This container of resin and a separate container of MDI were conditioned to room temperature (23° C.). Sufficient amounts of the resin component and appropriate amounts of MDI as indicated in the tables were measured into a one-half gallon paper can. The resin and isocyanate components were mixed for about 6 seconds with a propeller or "Jiffy" mixer at nominally 3000 rpm. The resin/isocyanate mix was weighed into a (45° C. to 55° C.) preheated 2.5 cm×30.5 cm×30.5 cm×12.5 cm×22.9 cm×22.9 cm metal plaque mold. The mold was closed and clamped if necessary. The foam was allowed to rise and cure. Subsequently the foam plaque was removed from the mold and allowed to age for at least seven days prior to physical testing.

TABLE 1

| Formulation | A | B | C |
|---|---|---|---|
| Polyol A | 22.0 | 22.0 | 22.0 |
| Polyol B | 10.0 | 10.0 | 10.0 |
| Polyol C | 23.0 | 23.0 | 23.0 |
| T-203 | 20.0 | 20.0 | 20.0 |
| TIPA | 20.0 | 20.0 | 20.0 |
| Glycerine | 5.0 | 5.0 | 5.0 |
| DC-197 | 0.7 | 0.7 | 0.7 |
| L-5420 | 0.8 | 0.8 | 0.8 |
| F-11A | 5.5 | 2.0 | 2.0 |
| F-113 | 5.5 | — | — |
| DIDP | 12.0 | 12.0 | 12.0 |
| 33-LV | 0.7 | 1.2 | 1.2 |
| UL-1 | 0.1 | 0.1 | 0.1 |
| Pigment | 2.0 | 2.0 | 2.0 |
| A-1 | — | 0.5 | 0.3 |
| H$_2$O | — | 1.1 | 1.1 |
| TOTAL | 127.3 | 120.4 | 120.2 |
| M-20S | 127.3 | 143.5 | 143.5 |
| PCF | 12.0 | 12.0 | 12.0 |
| Physical Properties | | | |
| Molded Density Kg/m$^3$ | 339 | 317 | 348 |
| Compressive Strength KPA | 2797 | 6415 | 7414 |
| Flexural Strength KPA | 9935 | 13387 | 15303 |

As is illustrated in table one, the physical properties, i.e. compressive strength and flexural strength, were improved significantly in formulations B and C when compared with formulation A. In both formulations B and C water is used as an auxiliary blowing agent. An additional advantage of the present invention is that the amount of chloroflourocarbons used is reduced by up to 80%.

The embodiments of the present invention in which an exclusive property or privilege is claimed are defined as follows:

We claim:

1. An integral skin, rigid polyurethane foam having improved compressive strength and flexible strength characteristics, consisting of the reaction product of
a) a polyoxyethylene capped polyoxyalkylene polyether polyol and at least one other polyol selected from the group consisting of a polyoxyalkylene polyether polyol wherein the polyoxyalkylene contains oxyalkylene monomers having greater than two carbons, a polyester polyol, and mixtures thereof, b) an organic aromatic polyisocyanate wherein all the isocyanate groups are aromatically bound, c) a chain extender, d) a blowing agent mixture consisting of water and a volatile blowing agent, e) a catalyst capable of promoting urethane formation, and f) optionally pigments and flame retardant.

2. The foam of claim 1 wherein the polyoxyethylene capped polyether polyol has a molecular weight of from about 470 to about 4200 and polyoxyethylene content of from about 15 wt. % to 35 wt %.

3. The foam as claimed in claim 1 wherein the chain extender is selected from the group consisting of ethylene glycol, glycerine trimethylopropane, propylene glycol, butanediol, alkanolamine, and primary and secondary diamines.

4. The foam as claimed in claim 1 wherein the blowing agent consists of from about 0.09:9.0 wt % to about 0.9:1.6 wt % water/volatile blowing agent based on the total weight of the resin components.

5. The foam as claimed in claim 1 wherein the organic aromatic isocyanate is selected from the group consisting of diphenylmethane diisocyanate, polymeric diphenylmethane diisocyanate, and a carbodiimide modified diphenylmethane diisocyanate.

6. The foam as claimed in claim 1 wherein the volatile blowing agent is selected from the group consisting of dichlorodifluoromethane, 1,1,2-trichloro-1,1,2-trifluoroethane and mixtures thereof.

7. A process for preparing integral skin rigid polyol urethane foam having improved compressive strength and flexible strength characteristics, consisting of reacting;

a) a polyoxyethylene capped polyoxyalkylene polyether polyol, and at least one other polyol selected from the group consisting of, a polyoxyalkylene polyether polyol wherein the polyoxyalkylene contains oxyalkylene monomers having greater than two carbons, a polyester polyol, and mixtures thereof, b) an organic aromatic polyisocyanate wherein all the isocyanate groups are aromatically bound, c) a chain extender, d) a blowing agent mixture consisting of water and a volatile blowing agent, e) a catalyst capable of promoting urethane formation, and f) optionally pigments and flame retardants.

8. The process as claimed in claim 7 wherein the polyoxyethylene capped polyether polyol has a molecular weight of from about 470 to about 4200 and a polyoxyethylene content of about 15 wt. % to about 35 wt. % based on the total weight of the non-isocyanate components.

9. The process as claimed in claim 7 wherein the chain extender is a mixture of glycerine and tiisopropanolamine.

10. The process as claimed in claim 7 wherein the blowing agent consists of from about 0.09:90 wt. % to about 0.9:1.6 wt. % water/chlorofluorocarbon, based on the total weight of the nonisocyanate components.

11. The process as claimed in claim 7 wherein the aromatic isocyanate is selected from the group consisting of diphenyl methane diisocyanate, polymeric diphenylmethane diisocyanate, and a carbodiimide modified diphenyl methane diisocyanate.

12. The process as claimed in claim 7 wherein the volatile blowing agent is selected from the group consisting of dichlorodifluoromethane, 1,1,2-trichloro-1,1,2-trifluoroethane and mixtures thereof.

* * * * *